United States Patent [19]

Frisch

[11] Patent Number: 5,119,679
[45] Date of Patent: Jun. 9, 1992

[54] OPTICALLY POWERED AND LINKED PRESSURE TRANSDUCER

[75] Inventor: Israel Frisch, Seattle, Wash.

[73] Assignee: The Boeing Company, Seattle, Wash.

[21] Appl. No.: 681,854

[22] Filed: Apr. 5, 1991

[51] Int. Cl.⁵ .................. G01D 5/34; G01L 11/00
[52] U.S. Cl. ................................ 73/705; 73/702; 250/227.21
[58] Field of Search ............... 73/705, 702, 703, 704; 340/705, 980; 250/227.21

[56] References Cited

U.S. PATENT DOCUMENTS

| | | | |
|---|---|---|---|
| 4,212,513 | 7/1980 | Gravel | 350/96.15 |
| 4,283,114 | 8/1981 | Wandrack | 350/96.20 |
| 4,321,831 | 3/1982 | Tomlinson et al. | 73/705 |
| 4,325,137 | 4/1982 | Yoshikazu | 370/4 |
| 4,451,730 | 5/1984 | Brogardh et al. | 250/227 |
| 4,629,323 | 12/1986 | Matsumoto | 356/365 |
| 4,651,571 | 3/1987 | McGlade | 73/773 |
| 4,652,129 | 3/1987 | Martinelli | 356/345 |
| 4,678,905 | 7/1987 | Phillips | 250/227.21 |
| 4,833,317 | 5/1989 | Huggins | 250/237 |
| 4,848,906 | 7/1989 | Layton | 356/345 |
| 4,897,541 | 1/1990 | Phillips | 250/227.21 |
| 4,928,007 | 5/1990 | Furstenau et al. | 341/137 |

Primary Examiner—Donald O. Woodiel
Attorney, Agent, or Firm—Christensen, O'Connor, Johnson & Kindness

[57] ABSTRACT

A pressure sensing system that is relatively immune to EMI. The system comprises a sensor and a controller linked to one another by a fiber optic cable. The sensor includes an electronic pressure transducer, and means for converting an optical power signal received from the controller via the fiber optic cable into DC electrical power for the transducer. The transducer produces an electronic output signal that encodes the pressure, and this output signal is converted into a corresponding optical output signal that is transmitted to the controller along the fiber optic cable. A preferred pressure transducer is a vibrating crystal pressure transducer, the output signal of which is converted to electronic form at the controller, and demodulated by a counter. The power signal is preferably a time invariant, and not a function of the output signal.

10 Claims, 1 Drawing Sheet

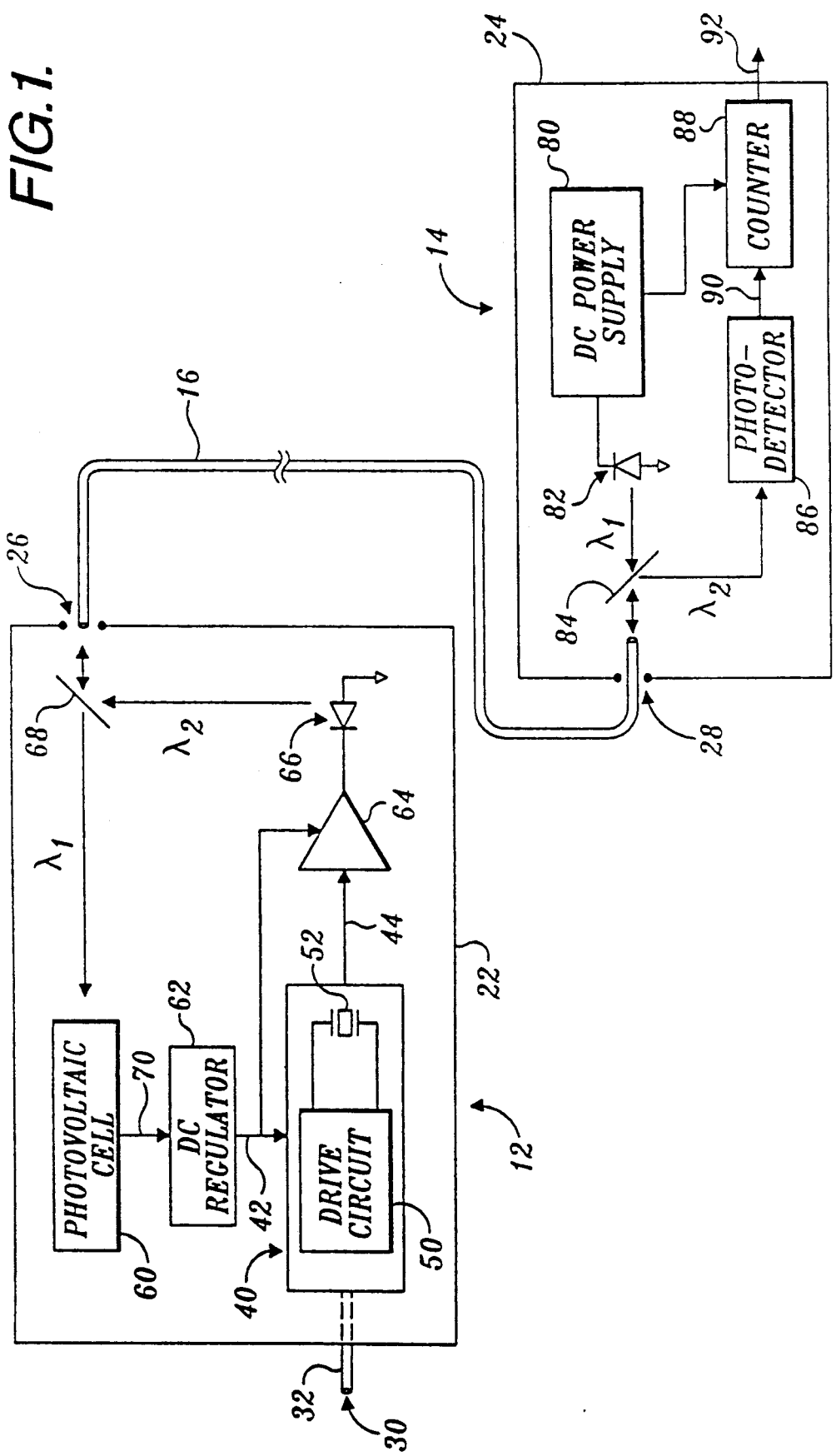

OPTICALLY POWERED AND LINKED PRESSURE TRANSDUCER

FIELD OF THE INVENTION

The present invention relates to pressure transducers, and particularly to pressure transducers that are adapted to operate in environments that include electromagnetic interference.

BACKGROUND OF THE INVENTION

One of the most difficult problems facing modern aviation is the protection of sensitive instruments and controls from electromagnetic interference (EMI). This problem applies to the pressure transducers that are the subject of the present invention. Such transducers are often used for critical propulsion and flight control functions, and spurious or incorrect information from pressure transducers can result in critical damage to an aircraft.

To avoid signal degradation through EMI, it has become common to provide sensitive transducers with metallic shielding. However, to achieve more complete protection, the wires and connectors carrying signals between a sensor and a control system must also be shielded. This additional shielding adds a significant amount of weight to an aircraft.

One way to reduce or eliminate the EMI problem is to use a passive, all-optical sensor. In such an arrangement, an optical signal is transmitted from a control system to the sensor, the optical signal is affected in some manner (e.g.. intensity modulation) at the sensor by the quantity being sensed, and the modulated optical signal is then returned from the sensor to the control system for detection. However, a requirement that a sensor cannot include any electronic components places a severe limit on the types of sensor that can be used, and on the quantities that can be sensed. In addition, all-optical sensors produced to date have been very expensive, and have not been able to match the resolution of electrical sensors.

For sensing pressure, a well-known type of sensor makes use of a piezoelectric (e.g., quartz) crystal mounted such that the crystal deforms in some manner in response to pressure. The crystal is coupled to a suitable drive circuit such that the combination of the drive circuit and crystal forms a crystal-controlled oscillator, i.e., an electrical oscillator whose oscillation frequency follows the "natural" oscillation frequency of the crystal itself. A change in pressure deforms the crystal such that the natural frequency of the crystal changes, causing the oscillator frequency to change. By measuring the frequency of the oscillator, the pressure can be determined.

An optically-powered strain sensor that utilizes a piezoelectric crystal is described in U.S. Pat. No. 4,651,571. In this system, a pulsed optical signal is launched through a fiber-optic cable to a remote sensor. At the sensor, the optical pulses are converted into a DC voltage, as well as into electrical pulses that are used to drive a quartz crystal into oscillation. The oscillation of the crystal generates an AC voltage signal that is fed to a detector that is powered by the DC voltage. The detector amplifies the electronic pulses, and converts them into a corresponding optical pulse train which is transmitted back to the drive circuit along a second fiber-optic cable. At the drive circuit, the returned optical pulses are converted by a photocell into an electronic output signal. The frequency of the output signal indicates the frequency of vibration of the crystal, and therefore of the strain. This output signal is also used as a feedback signal to modify the frequency of vibration of the original drive circuit.

Although the system described in U.S. Pat. No. 4,651,571 achieves the goal of transmitting only optical signals between the control system and sensor, it does so at the expense of a complex design. In addition, the described system, in effect, splits up the oscillator circuit between two sites coupled to one another by a pair of fiber-optic cables, producing a sensing system that is difficult to calibrate in an efficient and reliable manner.

SUMMARY OF THE INVENTION

The present invention provides a pressure sensing system that is particularly adapted for use in an environment that includes electromagnetic interference (EMI). The pressure sensing system is relatively straightforward in design, and does not require the pressure transducer itself to be divided between separate modules of the system.

In a preferred embodiment, the pressure sensing system comprises an EMI shielded sensor, an EMI shielded controller, and fiber-optic cable means coupling the sensor to the controller. The sensor comprises an electronic pressure transducer that includes means for receiving the fluid whose pressure is to be sensed, means for receiving DC electrical power, and means for producing an electronic output signal having a characteristic that encodes the pressure. The sensor also includes first conversion means for converting an optical power signal (from the controller) into the DC electrical power for operating the transducer, and second conversion means for converting the electronic output signal into a corresponding optical output signal.

The controller comprises means for generating the optical power signal, and means for receiving the optical output signal. Preferably, the controller also comprises means for converting the optical output signal into a corresponding electronic output signal. The fiber-optic cable means couples the optical power signal from the controller to the sensor, and couples the optical output signal from the sensor to the controller. In one embodiment, the fiber-optic cable means comprises a single fiber-optic cable for transmitting both optical signals. In a second embodiment, separate cables are used for the power and output signals. A preferred pressure transducer is a vibrating crystal pressure transducer, the output signal of which can be demodulated in the controller by a counter.

BRIEF DESCRIPTION OF THE FIGURE

FIG. 1 is a block diagram of a preferred embodiment of the pressure sensing system of the present invention.

DETAILED DESCRIPTION OF THE PREFERRED EMBODIMENT

A block diagram of a preferred embodiment of the sensing system of the present invention is set forth in FIG. 1. Generally, the sensing system comprises sensor 12 and controller 14 coupled to one another by a single fiber-optic cable 16. The sensor and controller include EMI shielded cases 22 and 24, respectively. The cases substantially shield the components located within from electromagnetic interference. Case 22 includes an EMI-proof optical connector 26 at which fiber-optic cable 16 enters case 22 while maintaining the EMI shielding. Case 24 of controller 14 includes a similar EMI-proof connector 28.

Sensor 12 includes pressure port 30 at which the sensor receives a fluid (e.g., air) whose pressure is to be measured. Preferably, pressure port 30 includes a conduit 32 having within it a metallic screen or the like, to substantially prevent electromagnetic interference from entering the sensor via the pressure port. The embodiment illustrated in FIG. 1 is an example of an absolute pressure sensor that measures the absolute value of pressure at its port. For a differential pressure measurement, two pressure ports would be used, each preferably with suitable metallic screening. Within sensor 12, the pressure of the fluid is sensed by pressure transducer 40. Transducer 40 receives DC electrical power on line 42, and produces an electronic output signal on line 44 that has some characteristic, such as frequency, that encodes the measured pressure.

In the illustrated embodiment, pressure transducer 40 is a vibrating crystal transducer, comprising an electronic drive circuit 50 coupled to piezoelectric crystal 52. The combination of drive circuit 50 and crystal 52 comprises an electronic oscillator that oscillates at a frequency substantially equal to one of the natural vibration frequencies of crystal 52. The pressure transducer is arranged such that a change in the pressure of the fluid entering port 30 produces a change in the natural vibration frequency of the crystal. For example in one possible arrangement, crystal 52 is mounted on a diaphragm that flexes as the pressure changes. As a result, the natural vibration frequency of the crystal, and therefore the oscillation frequency of the oscillator as a whole, encodes the pressure.

Although the preferred embodiment of the invention utilizes a vibrating crystal pressure transducer, other types of pressure transducers may also be used within the scope of the present invention. The principal requirements are that the transducers be capable of operating on relatively low power from a DC voltage, and that the transducer produce an output signal that encodes the sensed pressure. A particular advantage of a vibrating beam transducer is that the transducer output is an inherently digital signal i.e., a frequency, that can be readily transmitted to the controller and demodulated at the controller by a relatively simple counting circuit, as described below. Suitable vibrating crystal pressure transducers are available from ParoScientific of Redmond, Wash.

In a conventional pressure sensing system, the electronic output signal on line 44 would be routed to controller 14 via an electrical wire, and a second wire (plus a ground wire) would be required to couple electrical power from the controller to the sensor. This arrangement would require that all wires include EMI shielding. By contrast, in a preferred embodiment of the present invention, electrical power and the transducer output signal are carried between the sensor and controller via a single fiber-optic cable 16, thereby resulting in a signficant decrease in the shielding requirements of the system.

In addition to transducer 40, sensor 12 includes photovoltaic cell 60, DC regulator 62, output driver 64, optical source (e.g., LED) 66, and beamsplitter 68. As further described below, controller 14 probably produces a DC (i.e., time invariant) optical power signal on fiber-optic cable 16, at a first wavelength $\lambda_1$. Beamsplitter 68 is made transmissive at $\lambda_1$, such that the optical power signal passes through the beamsplitter, and strikes photovoltaic cell 60. The photovoltaic cell preferably is a high-efficiency type of photovoltaic cell, such as a GaAs photovoltaic cell. The photovoltaic cell may also comprise a tandem cell to further maximize efficiency. The photovoltaic cell responds to the optical power signal by producing a DC electrical signal on line 70. As it is well known to those skilled in the art, a plurality of photovoltaic cells may be arranged in series such that each receives a portion of the power signal at $\lambda_1$, to produce a suitable voltage level. The electrical power signal on line 70 is input to DC regulator 62, the regulator providing filtering to provide a steady DC voltage level on line 42.

The frequency-modulated output signal produced by transducer 40 on line 44 is input to driver 64 that also derives its electrical power from regulator 62. The output of driver 64 drives optical source 66 that emits at a wavelength $\lambda_2$ different from $\lambda_1$. Thus the combination of driver and optical source converts the FM electrical output signal on line 44 into an equivalent optical "data" signal at wavelength $\lambda_2$. Beamsplitter 68 is made reflective at $\lambda_2$, such that the beamsplitter reflects the data signal produced by optical source 66 back into fiber-optic cable 16.

Turning now to controller 14, in a preferred embodiment, the controller comprises DC power supply 80, optical source 82, beamsplitter 84, photodetector 86, and counter 88. Optical source 82 may comprise, for example, a laser diode, a light-emitting diode, a superluminescent diode, or a xenon lamp. DC power supply 80 energizes optical source 82, such that the optical source produces a steady state optical "power" signal at a first wavelength $\lambda_1$. Preferably, DC power supply 80 energizes optical source 82 in a manner that is independent of the optical output signal returned from the sensor, i.e. the DC power supply is not part of a feedback circuit. This produces a significant simplification in comparison to some prior designs.

Beamsplitter 84 preferably has transmission/reflection characteristics similar to that of beamsplitter 68. Thus beamsplitter 84 transmits the power signal at $\lambda_1$ into fiber-optic cable 16. However, the data signal at $\lambda_2$ that returns from the sensor via fiber-optic cable 16 is reflected by beamsplitter 84 into photodetector 86. The photodetector produces a corresponding electrical signal on line 90 that is input to counter 88. By counting cycles of the FM data signal over predescribed time intervals, counter 88 demodulates the FM data signal, to produce a pressure signal on line 92 that indicates the sensed pressure.

While a preferred embodiment of the invention has been illustrated, variations will be apparent to those skilled in the art. For example, sensor 12 and controller 14 could be interconnected by a pair of fiber-optic cables, one fiber-optic cable for coupling the power signal from optical source 82 to photovoltaic cell 60, and a second fiber-optic cable for coupling the data signal from optical source 66 to photodetector 86. In such a two-cable embodiment, the beamsplitters would not be needed, and in general a higher optical efficiency would be achieved at the expense of using two cables.

The embodiments of the invention in which an exclusive property or privilege is claimed are defined as follows:

1. A pressure sensing system adapted for use in an EMI environment, the system comprising:
   (a) an EMI shielded sensor comprising:

(i) an electronic pressure transducer, the pressure transducer comprising means for receiving a fluid whose pressure is to be sensed, means for receiving DC electrical power, and means for producing an electronic output signal having a characteristic that encodes the pressure of said fluid;

(ii) first conversion means including means for receiving an optical power signal, means for converting the optical power signal into said DC electrical power, and means for coupling said DC electrical power to the pressure transducer; and (iii) second conversion means including means for receiving the electronic output signal and means for converting the electronic output signal into a corresponding optical output signal;

(b) an EMI shielded controller comprising:

(i) means for generating the optical power signal; and (ii) means for receiving the optical output signal; and (c) fiber-optic cable means for coupling the optical power signal from the controller to the sensor and for coupling the optical output signal from the sensor to the controller.

2. The system of claim 1, wherein the controller further comprises means for converting the optical output signal into a corresponding electronic output signal.

3. The system of claim 2, wherein the controller further comprises means for converting the optical output signal into a corresponding electronic output signal, and a counter for demodulating the electronic output signal.

4. The system of claim 1, wherein the optical power signal generated by the controller does not vary as a function of the optical output signal received by the controller.

5. The system of claim 4, wherein the optical power signal is substantially time invariant.

6. The system of claim 1, wherein the pressure transducer comprises a vibrating crystal pressure transducer.

7. The system of claim 1, wherein the fiber-optic cable means comprises a single fiber-optic cable for coupling the optical power signal from the controller to the sensor and for coupling the optical output signal from the sensor to the controller.

8. The system of claim 7, wherein the optical power signal is generated at a first wavelength $\lambda_1$, and wherein the optical output signal is generated at a second wavelength $\lambda_2$ different from $\lambda_1$.

9. The system of claim 8, wherein the sensor comprises first beamsplitting means and wherein the controller comprises second beamsplitting means, each beamsplitting means having a transmission VS reflection property that are different at $\lambda_1$ than at $\lambda_2$.

10. The system of claim 1, wherein the pressure transducer comprises a conduit through which the fluid is received, and wherein the conduit comprises a metallic screen for reducing the amount of EMI entering the pressure transducer through the conduit.

* * * * *